Sept. 12, 1967     R. V. HALL     3,340,740
CONTROL APPARATUS
Filed Jan. 14, 1965

INVENTOR.
RAYMOND V. HALL
BY
Roger W. Hansen
ATTORNEY

United States Patent Office 3,340,740
Patented Sept. 12, 1967

3,340,740
CONTROL APPARATUS
Raymond V. Hall, Minneapolis, Minn., assignor to Honeywell Inc., Minneapolis, Minn., a corporation of Delaware
Filed Jan. 14, 1965, Ser. No. 425,399
4 Claims. (Cl. 74—5.6)

The present invention pertains to fluid sensors, and more particularly, to fluid speed sensors for detection and measurement of the angular velocity and orientation of a rotating body.

Various schemes have been provided in the prior art for the measurement of angular velocity of a rotating member. Complex and expensive arrangements were normally required to provide the accuracy demanded in precision instruments such as gyroscopic devices. In such instruments, where the relative motion between a free member and its support is to be measured, it is important that the measuring apparatus does not itself interfere with the free motion of the member. It is important that the energy transfer between the member and the measuring means is not excessive. For this reason, arrangements which do not require mechanical coupling between the member and the pickoff are most desirable.

The inventor has discovered that the pressure of the fluid immediately adjacent to a rotating member is proportional to the angular velocity of the member. A pressure sensor adapted to measure the fluid pressure adjacent to the member will, therefore, provide an output indicative of the angular velocity of the member. In addition, the pressure is a function of the radial distance from the spin axis to the periphery of the member. Thus, a pressure pickoff positioned adjacent to a spherical member of a free rotor gyroscope will also provide information regarding the angular displacement of the spin axis with respect to the housing.

In one embodiment of the present invention, a pair of pickoffs or a plurality of pairs of pressure pickoffs are mounted on the housing adjacent the spherical member of a gyroscope. The two pickoffs of each pair are positioned at two locations such that when the spin axis is in a preferred position, the two pickoffs are the same radial distance from the spin axis, and, thus, the pressure at the two pickoffs is the same. A displacement of the spin axis from its preferred orientation will cause an increased pressure at one of the two pickoffs and a decreased pressure at the other. The pressure difference is indicative of the angular displacement of the spin axis with respect to the housing.

It is, therefore, an object of the present invention to provide an improved means for detecting the angular velocity of a rotating member. It is a further object of the present invention to provide pickoff means for detecting the angular displacement of a spin axis of a member with respect to its support.

These and further objects will become apparent to those skilled in the art upon examination of the following specification, claims and drawings, in which:

Figure 1:
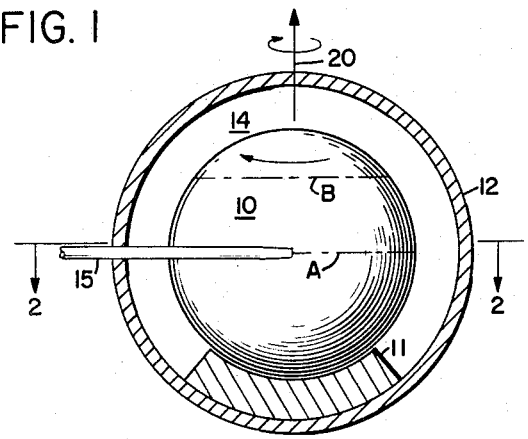
FIGURE 1 is an illustration of the apparatus for sensing angular velocity of a rotating member.
Figure 2:
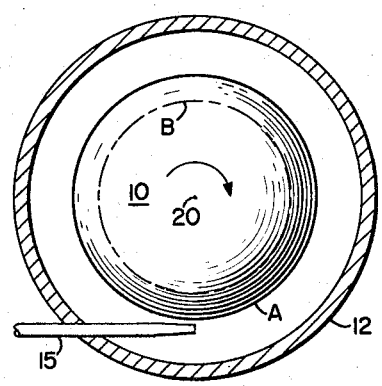
FIGURE 2 is an alternate view of the apparatus of FIGURE 1.

Referring now to FIGURE 1, an inertial member 10 is supported on a support 11 within housing 12. A pitot tube 15 is mounted on housing 12 and adjacent to spherical member 10. The space between member 10 and housing 12 is filled with a fluid 14, which may be air or other suitable gas or liquid. Rotation of member 10 imparts a velocity to the fluid immediately adjacent member 10. The velocity imparted to the fluid is proportional to the surface velocity of the member. Therefore, the velocity of the fluid adjacent the portions of member 10 furthest removed from the spin axis will be the greatest, while the velocity of the fluid adjacent the portions of member 10 nearest the spin axis will be the least. Thus, in FIGURE 1, where the spinning member is depicted as a sphere, pitot tube 15 is oriented substantially perpendicular to spin axis 20 and lies along a tangent to member 10 with the opening of the pitot tube at the point nearest member 10 and turned against the flow of the fluid. The pressure sensed by pitot tube 15 is the total pressure which is proportional to the velocity of the fluid. The output signal of pitot tube 15 is a pressure signal proportional to the angular velocity of member 10.

So far it has been assumed that the spin axis of the member has been in constant relationship with the housing, or in other words, that the tip of the pitot tube has throughout the operation remained adjacent the same latitude of the member. In FIGURE 1 pitot tube 15 is depicted in the equitorial plane illustrated by latitude line A. Should the orientation of the spin axis with respect to support 11 change, or should the pitot tube 15 be moved adjacent a different latitude on member 10, as for example illustrated by line B in FIGURE 1, the pressure output of pitot tube 15 would vary as a function of such a change. Hence, if the angular velocity of the member is maintained constant, the pressure output of pitot tube 15 would be indicative of the orientation of spin axis 20 with respect to member 10.

Figure 4:
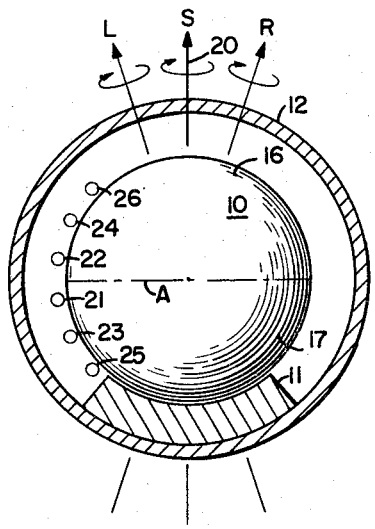
FIGURE 4 is an alternate view of FIGURE 3.

More accurate information regarding the spin axis displacement may be obtained by using a number of pressure pickoffs, rather than just one. If, for example, two pickoffs are mounted on the gyro housing adjacent to the member at two separate locations but equal distance from the spin axis when the spin axis is in its preferred orientation, the pressure at the two pickoffs will be the same and will remain the same as long as the spin axis is maintained in its preferred position. As the orientation of the spin axis changes, however, the pressure at one pickoff will increase while the pressure at the other pickoff will decrease. The differential signal obtained from the two pickoffs is indicative of the angular displacement of the spin axis. The accuracy and the signal magnitude may be increased by increasing the number of pickoffs. Such an arrangement is shown in FIGURE 4 where three pairs of pitot tubes are mounted on housing 12 adjacent spherical member 10. It is assumed now that spin axis 20 of member 10 and housing 12 are in the preferred relative orientation which in FIGURE 4 is labeled S. The six pitot tubes have their open ends lined up along a great circle passing through the spin axis. The arrangement is symmetrical along the equatorial plane A of member 10. Equatorial plane A divides member 10 into upper and lower hemispheres 16 and 17 respectively. Pitot tubes 21, 23 and 25 are mounted adjacent lower hemisphere 17 and pitot tubes 22, 24 and 26 are mounted adjacent upper hemisphere 16. Another view of this arrangement is shown in FIGURE 4.

The output signals from pitot tubes 21–26 are applied to the control inputs of a proportional fluid amplifier 40. Proportional amplifier 40 has three upper control inputs 41, 43 and 45 and three lower control inputs 42, 44 and 46. Adjectives "upper" and "lower," both in reference to member 10 and amplifier 40, are used here only for the purpose of explaining the apparatus as illustrated in the drawing and do not necessarily have any relation to the actual physical orientation of the device. The apparatus is equally capable of operation in any orientation.

The output signals from the three pitot tubes 21, 23 and 25 which are adjacent to the lower hemisphere 17 of member 10 are applied to upper control inputs 41, 43 and 45 respectively by means of fluid conductors 31, 33 and 35. The pressure signals from pitot tubes 22, 24 and 26 which are adjacent the upper hemipshere 16 of member 10 are applied to lower control inputs 42 and 44 and 46 respectively by means of fluid conductors 32, 34 and 36.

In amplifier 40, power is provided from a supply nozzle 50. Amplifier 40 further has an interaction chamber 49 in fluid communication with supply nozzle 50 and control inputs 41–46 and first output leg 47 and second output leg 48 in fluid communication with chamber 49.

When spin axis 20 is in its preferred orientation, the pressure sensed at pitot tube 21 will equal that sensed by pitot tube 22, the pressure at pitot tube 23 will equal to the pressure at pitot tube 24 and the pressure at pitot tube 25 will equal the pressure sensed by pitot tube 26. Thus, the sum of the pressure signals applied to the upper control inputs of amplifier 40 will equal to the sum of the pressure signals applied to the lower control inputs. As a result there will be a zero net difference pressure between the upper and the lower control signals and the power jet from the supply input 50 will remain undeflected as it passes through interaction chamber 49 so that the output flow will be equally divided between output legs 47 and 48.

Figure 3:
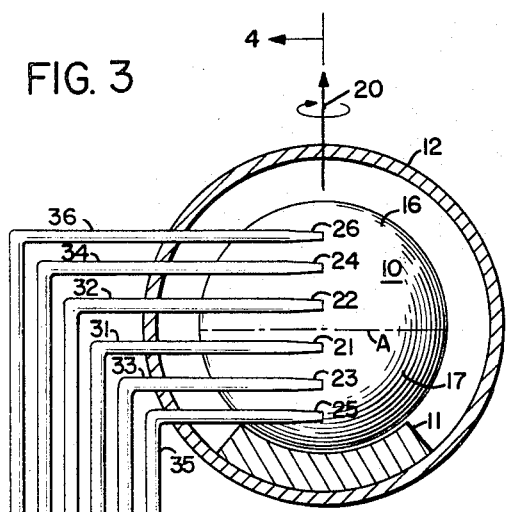
FIGURE 3 is an apparatus for detecting the angular displacement of the spin axis of a spherical member with respect to its support.

If now a relative motion should occur between inertial member 10 and housing 12 so that the spin axis of member 10 will achieve an orientation relative to housing as shown by arrow L in FIGURE 4, the pressures sensed by pitot tubes 22, 24 and 26 will decrease while the pressures sensed by pitot tubes 21, 23 and 25 will correspondingly increase. The sum of the pressure signals applied to the upper inputs of amplifier 40 will now exceed the sum of the pressure signals applied at the lower inputs and the power jet from supply 50 will be deflected in interaction chamber 49 causing more fluid to flow through output leg 48 than through output leg 47. Conversely, if the relative motion between member 10 and housing 12 should be such that the spin axis would be pointing along arrow R, as shown in FIGURE 4, the pressure sensed by pitot tubes 22, 24 and 26 would exceed the pressure sensed by pitot tubes 21, 23 and 25, and the sum of the signals at the lower inputs 42, 44 and 46 would exceed the sum of the input signals at the upper inputs 41, 43 and 45, causing the flow through output leg 47 to exceed the flow through output leg 48. The output pressure signal of amplifier 40 may be used as a control function, or it may be simply measured, as illustrated in FIGURE 3, to provide information.

Many variations and embodiments are possible within the spirit of this invention. It is, therefore, understood that the specific embodiment of my invention shown here is for the purpose of illustration only, and that my invention is limited only by the scope of the appended claims.

What is claimed is:

1. Apparatus for detection of relative angular displacement of a spherical member and its support in a fluid environment, said apparatus comprising:
    a base;
    a spherical member universally supported on said base and adapted for rotation about a spin axis, said axis having a preferred angular relation to said housing;
    a pair of pressure pickoffs mounted on said base ad-adjacent said member for sensing pressure adjacent two separated points on said member, said two points being radially equi-distant from said spin axis when the spin axis of said member is in its preferred angular relation to said housing; and
    means for detecting the difference in the pressure at said pair of pickoffs, said difference being indicative of the relative orientation between said base and the spin axis of said member.

2. Apparatus for detection of relative angular displacement of a spherical member and its support in a fluid environment, said apparatus comprising:
    a base;
    a spherical member universally supported on said base and adapted for rotation about a spin axis, said axis having a preferred angular relation to said housing;
    a pair of pitot tubes mounted on said base adjacent said member for sensing pressure adjacent two seperated points on said member, said two points being radially equi-distant from said spin axis when the spin axis of said member is in its preferred angular relation to said housing; and
    means for detecting the difference in the pressure at said pair of pitot tubes, said difference being indicative of the relative orientation between said base and the spin axis of said member.

3. Apparatus for producing an analogue signal indicative of the relative angular displacement of a spherical member and its support in a fluid environment, said apparatus comprising:
    a housing;
    a spherical member universally supported within said housing and adapted for rotation about a spin axis, said spin axis having a preferred angular relation to said housing;
    a plurality of pairs of pressure pickoffs mounted on said housing for sensing pressure immediately adjacent said member, said pickoffs being located so that, when said spin axis is in its preferred orientation, the two pickoffs of each pair are radially equi-distant from said spin axis; and
    means for detecting the difference of pressures at the two pickoffs of each pair and for summing the difference of pressure detected at said plurality of pairs, the resulting sum being indicative of the angular displacement of said spin axis from its preferred orientation.

4. Apparatus for producing an analogue signal indicative of the relative angular displacement of a spherical member and its support in a fluid environment, said apparatus comprising:
    a housing;
    a spherical member universally supported within said housing and adapted for rotation about a spin axis, said spin axis having a preferred angular relation to said housing;
    a plurality of pairs of pitot tubes mounted on said housing for sensing pressure immediately adjacent said member, said pitot tubes being located so that, when said spin axis is in its preferred orientation, the two pitot tubes of each pair radially are equi-distant from said spin axis; and
    means for detecting the difference of pressures at the two pitot tubes of each pair and for summing the difference of pressure detected at said plurality of pairs, the resulting sum being indicative of the displacement of said spin axis from its preferred orientation.

References Cited

UNITED STATES PATENTS

| 2,315,019 | 3/1943 | Samuelson | 73—502 X |
| 3,200,653 | 8/1965 | Wing | 74—5 |
| 3,267,747 | 8/1966 | Paine | 74—5.7 |

FRED C. MATTERN, Jr., *Primary Examiner.*

J. PUFFER. *Assistant Examiner.*